US010262506B2

(12) United States Patent
Aga et al.

(10) Patent No.: US 10,262,506 B2
(45) Date of Patent: *Apr. 16, 2019

(54) METHOD AND SYSTEM FOR PAIRING A SENSOR DEVICE TO A USER

(71) Applicant: Vital Connect, Inc., San Jose, CA (US)

(72) Inventors: Arshan Aga, Mountain View, CA (US); Yun Yang, Los Altos, CA (US); Saeed Azimi, Los Gatos, CA (US)

(73) Assignee: VITAL CONNECT, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/643,762

(22) Filed: Jul. 7, 2017

(65) Prior Publication Data

US 2017/0311116 A1    Oct. 26, 2017

Related U.S. Application Data

(63) Continuation-in-part of application No. 13/301,546, filed on Nov. 21, 2011, now Pat. No. 9,936,382.

(51) Int. Cl.
| | |
|---|---|
| *H04W 4/21* | (2018.01) |
| *G08B 1/08* | (2006.01) |
| *H04W 4/70* | (2018.01) |
| *H04W 12/06* | (2009.01) |
| *H04W 76/10* | (2018.01) |

(52) U.S. Cl.
CPC ............. *G08B 1/08* (2013.01); *H04W 4/21* (2018.02); *H04W 4/70* (2018.02); *H04W 12/06* (2013.01); *H04W 76/10* (2018.02)

(58) Field of Classification Search
CPC ............ G08B 1/08; H04W 4/70; H04W 4/21; H04W 76/10; H04W 12/06

USPC ..................................................... 340/539.23
See application file for complete search history.

(56) References Cited

U.S. PATENT DOCUMENTS

| | | | |
|---|---|---|---|
| 7,848,703 B1 | 12/2010 | Beard et al. | |
| 8,116,685 B2 | 2/2012 | Bregman-Amitai et al. | |
| 8,353,447 B2 | 1/2013 | Yach | |
| 8,879,994 B2 | 11/2014 | Brown et al. | |
| 2002/0190128 A1 | 12/2002 | Levine et al. | |

(Continued)

OTHER PUBLICATIONS

PCT International Search Report and Written Opinion of the International Searching Authority, dated Mar. 18, 2013, application No. PCT/US2012/065340.

*Primary Examiner* — Jack K Wang
(74) *Attorney, Agent, or Firm* — Brundidge & Stanger, P.C.

(57) ABSTRACT

A method, system, and a computer-readable medium for pairing a wireless sensor device which is associated with a user to a wireless relay device are disclosed. The method, system, and computer-readable medium comprise providing an identification code that includes a network address within the wireless sensor device. The method, system, and computer-readable medium include utilizing an application within a wireless relay device. The application selects the wireless sensor device by using the corresponding identification code, scans for network addresses, and compares the network address to the scanned network addresses. When the network address matches one of the scanned network addresses, the wireless sensor device is paired to the wireless relay device by the application.

20 Claims, 6 Drawing Sheets

(56) References Cited

U.S. PATENT DOCUMENTS

| | | |
|---|---|---|
| 2004/0253923 A1 | 12/2004 | Braley et al. |
| 2005/0136901 A1 | 6/2005 | Jung et al. |
| 2005/0139680 A1* | 6/2005 | Anttila .................. G06K 1/18 235/462.46 |
| 2005/0258250 A1* | 11/2005 | Melick ................ G06K 7/1095 235/462.46 |
| 2007/0069030 A1* | 3/2007 | Sauerwein, Jr. ..... G06K 7/0004 235/462.46 |
| 2007/0123166 A1 | 5/2007 | Sheynman et al. |
| 2007/0141989 A1 | 6/2007 | Flinchem |
| 2007/0249286 A1 | 10/2007 | Ma et al. |
| 2008/0280627 A1 | 11/2008 | Moran |
| 2009/0225172 A1 | 9/2009 | Tsuchiya |
| 2010/0099418 A1 | 4/2010 | Holley et al. |
| 2010/0185754 A1 | 7/2010 | Owen |
| 2010/0263006 A1 | 10/2010 | Matsuyama |
| 2010/0315225 A1* | 12/2010 | Teague ................. A61B 5/0024 340/539.12 |
| 2011/0072263 A1 | 3/2011 | Bishop et al. |
| 2011/0081860 A1* | 4/2011 | Brown ............... H04N 1/00347 455/41.3 |
| 2011/0221590 A1 | 9/2011 | Baker et al. |
| 2011/0295502 A1* | 12/2011 | Faenger .............. H04M 1/7253 701/431 |
| 2012/0015605 A1* | 1/2012 | Sole ...................... H04W 12/06 455/41.3 |
| 2012/0124799 A1* | 5/2012 | Addy ................... G08B 25/003 29/407.1 |
| 2012/0190299 A1 | 7/2012 | Takatsuka et al. |
| 2012/0324054 A1 | 12/2012 | Gibbon et al. |
| 2012/0324076 A1* | 12/2012 | Zerr ........................ H04W 4/21 709/223 |
| 2013/0005246 A1 | 1/2013 | Waters et al. |
| 2013/0060591 A1* | 3/2013 | Meegan ............. G06Q 30/0214 705/7.19 |
| 2013/0130622 A1 | 5/2013 | Yang et al. |
| 2013/0190018 A1* | 7/2013 | Mathews .............. H04W 4/023 455/456.6 |
| 2014/0013100 A1* | 1/2014 | Menzel ........... H04N 21/43637 713/150 |
| 2014/0067426 A1 | 3/2014 | Neff |
| 2014/0235205 A1 | 8/2014 | Paluch et al. |
| 2015/0002261 A1 | 1/2015 | Schiavi et al. |

* cited by examiner

CONNECTION MANAGER
525

APPLICATION MANAGER
505

SLAVE DEVICE DETECTOR
510

SLAVE DEVICE IDENTIFIER
515

SLAVE DEVICE CONNECTOR
520

FIG. 5

METHOD AND SYSTEM FOR PAIRING A SENSOR DEVICE TO A USER

CROSS-REFERENCE TO RELATED APPLICATION

The present application is a continuation-in-part application filed under 37 C.F.R. § 1.53(b), which claims the benefit of U.S. application Ser. No. 13/301,546, filed Nov. 21, 2011, under 35 U.S.C. § 120. The content of this application is incorporated herein by reference in their entirety.

FIELD OF THE INVENTION

The present invention relates to wireless sensor devices, and more particularly, to a method and system for wireless sensor device pairing.

BACKGROUND

Wireless sensor devices are used in a variety of applications including the health monitoring of individuals. Tracking the usage of these wireless sensor devices is essential to enabling the proper recordation of pertinent health related data and information. These wireless sensor devices can be manually registered to users on an individual basis. However, to register these wireless sensor devices, the unique network address of each wireless sensor device must be readily known and manually registered to each individual. As a result, the registration process of the wireless sensor device can be inefficient, time consuming and costly. Furthermore, a user of the wireless sensor device is sometimes required to go through a manual and potentially unnecessary process of setting up the connection of the wireless sensor device to the wireless relay device.

These issues limit the tracking and registration of wireless sensor devices. Therefore, there is a strong need for a cost-effective and more automated solution that overcomes the above issues by creating a method and system for automatically or manually pairing a wireless sensor device to a wireless relay device without having to input the unique network address of the wireless sensor device at the time of connection. Thus, when a wireless relay device, e.g., laptop computer, tablet, smart phone, wireless hub etc., initiates an application that requires a connection to a wireless sensor device, the user of the wireless relay device wants to connect to an identifiable and trust-worthy counterpart wireless sensor device in an automated fashion. The present invention addresses such a need.

SUMMARY OF THE INVENTION

In one example embodiment, system and computer-readable medium for pairing a wireless sensor device to a user are disclosed. The method comprises providing an identification code that includes a network address within the wireless sensor device. The method includes utilizing an application within a mobile device or relay device. The application selects the user, obtains the identification code, scans for network addresses, and compares the network address to the scanned network addresses. When the network address matches one of the scanned network addresses, the wireless sensor device is paired to the user by the application.

In another example embodiment, the system comprises a processing system and an application that is executed by the processing system. The application selects a user, obtains an identification code including a network address from a wireless sensor device, scans for network addresses, and compares the network address to the scanned network addresses. When the network address matches ones of the scanned network addresses, the wireless sensor device is paired to the user by the application.

In another example embodiment, the computer-readable medium comprises providing an identification code that includes a network address within the wireless sensor device. The computer-readable medium includes utilizing an application within a mobile or wireless relay device. The application selects the user, obtains the identification code, scans for network addresses, and compares the network address to the scanned network addresses. When the network address matches one of the scanned network addresses, the wireless sensor device is paired to the user by the application.

In another embodiment, a single or a list of network addresses that are associated with a single or set of wireless sensor devices that have been previously associated to the user of the wireless sensor device are loaded into the wireless relay device or mobile device. The wireless relay device or mobile device application will then automatically connect to the wireless sensor devices that it is able to see when it periodically scans for available devices to connect to.

In one example embodiment, A method for pairing a wireless sensor device to a user being monitored by the wireless sensor device, the method including: obtaining, by a relay device, an identification code from a wireless sensor device, wherein the identification code includes a network address that is uniquely assigned; utilizing, by the relay device, an application to select a user name associated with the user from a predetermined user list; wirelessly scanning, by the relay device, for network addresses of unconnected devices that are each within a predetermined proximity to the relay device, obtaining, by the relay device, the network addresses of the unconnected devices; comparing the network address from the obtained identification code of the wireless sensor device to the scanned network addresses of the unconnected devices; and automatically pairing, by the relay device, the wireless sensor device to the user by the application implemented by the relay device when the network address is matched to one of the scanned network addresses.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying figures illustrate several embodiments of the invention and, together with the description, serve to explain the principles of the invention. One of ordinary skill in the art will recognize that the particular embodiments illustrated in the figures are merely exemplary, the embodiments are not intended to limit the scope of the present invention, and the embodiments are described as illustrations only since various changes and modifications will become apparent to those skilled in the art from the following detailed description. The use of the same reference numbers in different figures indicates similar or identical items.

FIG. 5 illustrates an example configuration of a connection manager by which aspects of identifying a roaming device for a communicative connection may be implemented in accordance with an embodiment.

DETAILED DESCRIPTION OF PREFERRED EMBODIMENTS

Figure 1:
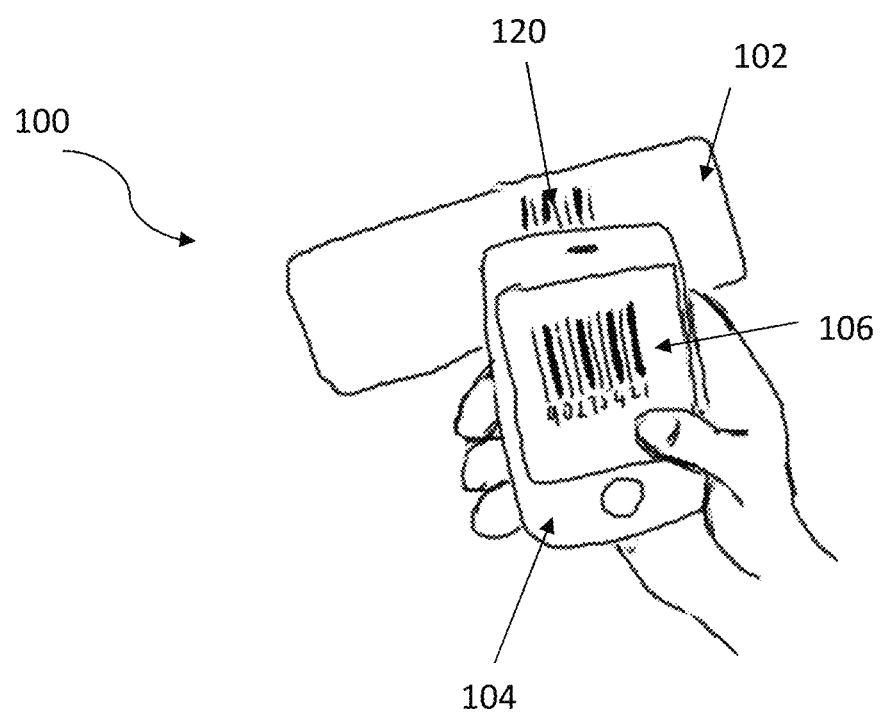
FIG. 1 illustrates a system in accordance with an embodiment.

The present invention relates to wireless sensor devices, and more particularly, to a method and system for wireless sensor device pairing. The following description is presented to enable one of ordinary skill in the art to make and use the invention and is provided in the context of a patent application and its requirements. Various modifications to the preferred embodiment and the generic principles and features described herein will be readily apparent to those skilled in the art. Further, reference is made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not meant to be limiting. Other embodiments may be utilized, and other changes may be made, without departing from the spirit or scope of the subject matter presented herein. It will be readily understood that the embodiments and aspects of the present disclosure, as generally described herein and illustrated in the drawings, may be arranged, substituted, combined, separated, and designed in a wide variety of different configurations, all of which are explicitly contemplated herein. Thus, the present invention is not intended to be limited to the embodiments shown but is to be accorded the widest scope consistent with the principles and features described herein.

A method and system in accordance with the present invention allows for a wireless sensor device to be seamlessly manually or automatically paired with a user and/or wireless relay device. By implementing an application within a mobile device or relay device, an efficient and cost-effective wireless sensor device pairing system is achieved that can support a significant number of users and devices. One of ordinary skill in the art readily recognizes that a variety of wireless sensor devices may be utilized and that would be within the spirit and scope of the present invention.

To describe the features of the present invention in more detail, refer now to the following description in conjunction with the accompanying Figures.

FIG. 1 illustrates a system 100 in accordance with an embodiment. The system 100 includes a wireless sensor device 102, a mobile device or relay device 104, and an application 106 coupled to the mobile device or relay device 104. The wireless sensor device 102 includes an identification code 120 with a network address. In one embodiment, the network address is a unique 48-bit network address.

One of ordinary skill in the art readily recognizes that the identification code 120 can be represented as a variety of codes including but not limited to a QR code or a bar code and that would be within the spirit and scope of the present invention. One of ordinary skill in the art readily recognizes that the wireless sensor device 102 and the mobile device or relay device 104, which may be mobile or stationary, can include a variety of devices including but not limited to health monitoring sensors, cell phones, cameras, notebook computer, laptop computer, smart phone, etc., that is capable of hosting, initiating, and/or operating an application for which operation includes, in part, being communicatively connected, at least, to other similar wired or wireless devices, including but not limited to one or more of slave devices or wireless sensor devices 102. The relay device 305 may be stationary and may be a desktop computer or hub device that can be wall mounted, ceiling mounted, and floor mounted or resting on a table. The relay device can be connected through a wired or wireless connection to a cloud or server or it may be stand-alone. Further the wired and wireless relay device may be battery powered or plugged into the wall and may or may not be mobile. Each of the above examples would be within the spirit and scope of the present invention.

As set forth above and further presented below, aspects and embodiments of the disclosure may be arranged, substituted, combined, separated, and designed in a wide variety of different configurations, all of which are explicitly contemplated herein; thus, the quantity and even positioning of the wireless sensor devices 102 and relay device 305 in FIG. 1 is in no way representative or limiting of all contemplated embodiments. Thus, unless context otherwise requires, reference may be made herein to singular or plural wireless sensor devices 102 and mobile device or relay device 104.

Figure 2A:
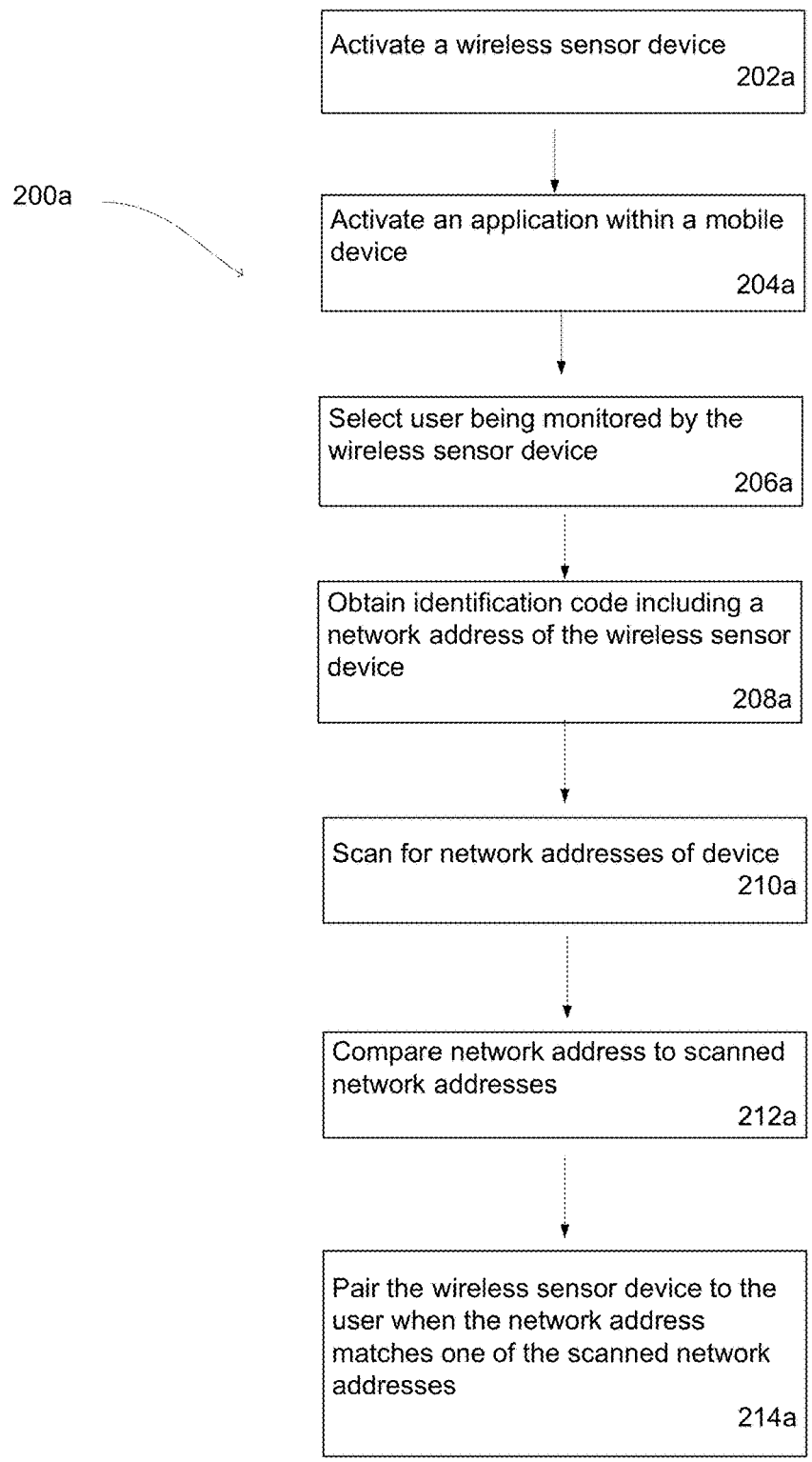
FIG. 2a illustrates a flow chart of a method in accordance with an embodiment.

FIG. 2a illustrates a flow chart 200a of a method in accordance with an embodiment. A wireless sensor device is activated prior to or after being placed on a user that is being monitored by the wireless sensor device, via step 202a. In step 204a, an application stored within a mobile device or relay device is activated by an operator of the mobile device or relay device. One of ordinary skill in the art readily recognizes that the application stored within the mobile device or relay device may be activated prior to activating the wireless sensor device and that activation would be within the spirit and scope of the present invention. In step 206a, the operator selects the user that is being monitored. In one embodiment, this selection is done by either selecting a user name from a predetermined user list or by entering a new user name into the application. One of ordinary skill in the art readily recognizes that additional information may be selected or entered by the operator of the application to identify the user that is being monitored and that would be within the spirit and scope of the present invention.

In step 208a, the operator uses the application to obtain an identification code including a network address associated with the wireless sensor device. In one embodiment, the network address is a unique 48-bit network address. One of ordinary skill in the art readily recognizes that the identification code may be obtained in a variety of ways including but not limited to turning on a camera within the mobile device or relay device, taking a picture of the identification code, and storing the picture on the mobile device or relay device and that would be within the spirit and scope of the present invention.

In addition, one of ordinary skill in the art readily recognizes that after the picture of the identification code is taken, the identification code may be processed and recognized using a variety of mechanisms including but not limited to an image processing algorithm implemented within the mobile device or relay device and the use of such mechanisms would be within the spirit and scope of the present invention.

In step 210a, the operator uses the application to scan for network addresses of devices. In one embodiment, unconnected Bluetooth wireless sensor devices in proximity to the mobile device or relay device are scanned and the network addresses of these unconnected Bluetooth wireless sensor devices are obtained by the application. One of ordinary skill in the art readily recognizes that a variety of methodologies may be utilized to determine the proximity of the unconnected devices to the mobile device or relay device including but not limited to detectable received signal strength indication (hereafter "RSSI") and location based GPS systems and that would be within the spirit and scope of the present invention. The proximity information may be a filtered or may use an algorithm from the basic GPS or RSSI signal. This may include but is not limited to low pass filtering, median filtering, etc. on the basic signal. In another embodiment, the relay device, if not connected to the server or cloud may have a preloaded sensor ID list that it will automatically connect to or load when the device is detected or if the device is detected and within a certain proximity. The relay device, if connected to a cloud or server, may upload the list to the cloud or server either periodically, or it may be pushed from the cloud or server, whenever the list is changed or updated, or it may be pulled from the relay device when a new sensor is detected that is not on the already stored list, or a combination of these.

After the application retrieves the preloaded network addresses of the devices, the application then automatically compares the preloaded network addresses to the scanned network addresses of the devices in step 212a. In step 214a, when the preloaded network address matches one of the scanned network addresses, the wireless sensor device is paired to the user by the application which completes the registration process.

As above described, the method and system allow for an automated pairing of a wireless sensor device to a user to improve the efficiency of wireless sensor device tracking and registration. By implementing an application within a mobile device or relay device, an efficient and cost-effective wireless sensor device pairing system is achieved that can support a significant number of users and devices.

Figure 2B:
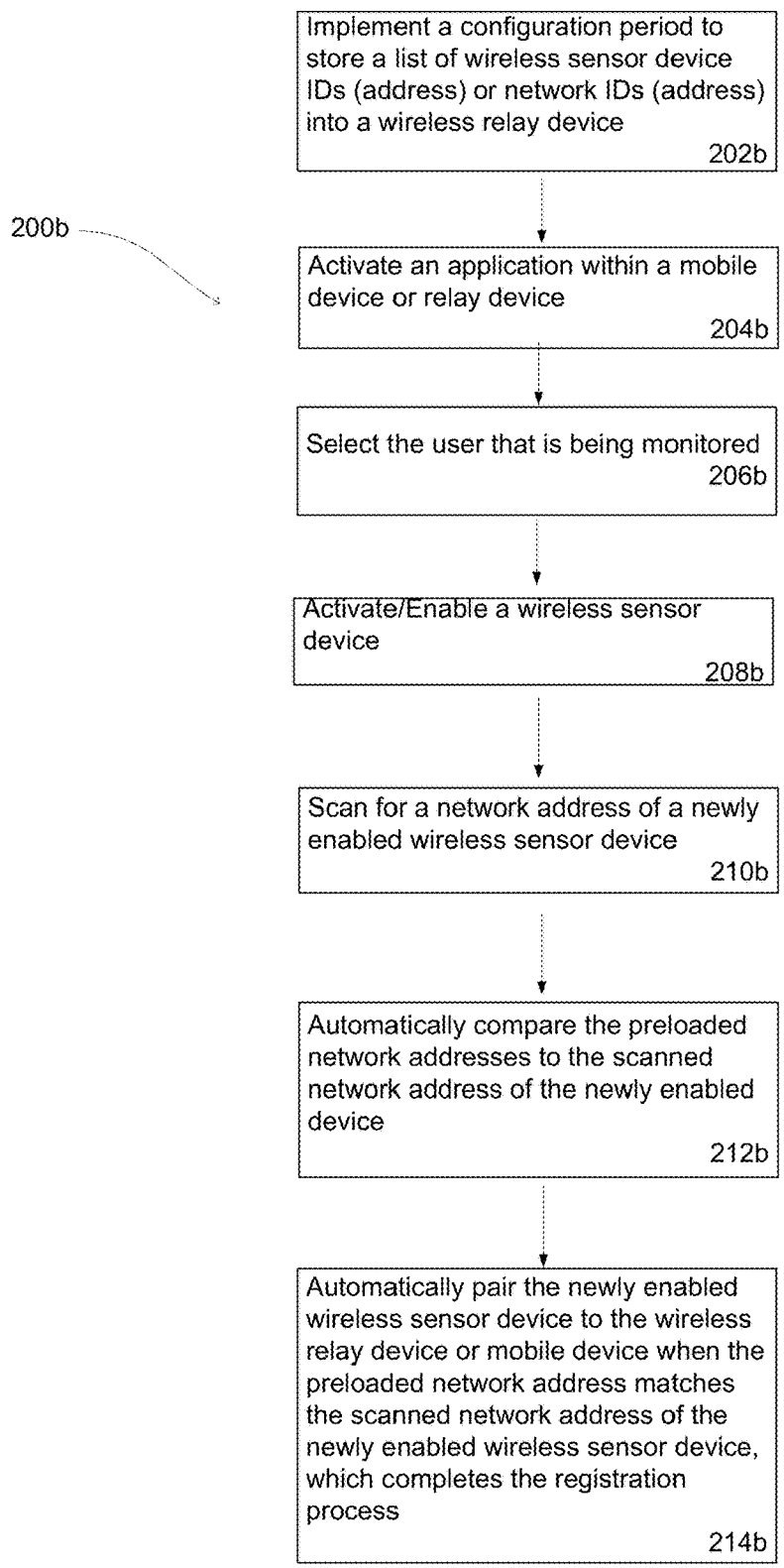
FIG. 2b illustrates a flow chart of a method in accordance with an embodiment.

FIG. 2b illustrates a flow chart 200b of a method in accordance with an embodiment. In step 202b, prior to, during, or after activation of a wireless sensor device, a configuration period is implemented automatically or by the operator where a list of wireless sensor device IDs or network IDs is loaded into a wireless relay device. Further, the wireless sensor device IDs or network Ds loaded into the wireless relay device may also be periodically refreshed or pre-loaded. One or more of the wireless sensor device IDs or network IDs may be associated with a user during the configuration period in step 202b. In step 204b, an application stored within a mobile device or relay device is activated by an operator of the mobile device or relay device. In step 206b, the operator selects the user that is being monitored. In one embodiment, this selection is done by either selecting a user name from a predetermined user list or by entering a new user name into the application. One of ordinary skill in the art readily recognizes that additional information may be selected or entered by the operator of the application to identify the user that is being monitored and that would be within the spirit and scope of the present invention. One of ordinary skill in the art readily recognizes that the application stored within the mobile device or relay device may be activated prior to activating the wireless sensor device and that activation would be within the spirit and scope of the present invention. In step 208b, a wireless sensor device is activated prior to or after being placed on a user that is being monitored by the wireless sensor device.

In step 210b, the application is automatically implemented by the mobile device or relay device to scan for or obtain a wireless sensor device ID (address) or network ID (address) of the newly enabled wireless sensor device. Either immediately after or at a later time of enabling the wireless sensor device, the wireless relay and the newly enabled wireless sensor device are automatically connected. That is, unconnected wireless sensor devices via Bluetooth or other wireless protocols in proximity to the mobile device or relay device are scanned, the network addresses of these unconnected Bluetooth wireless sensor devices are automatically obtained by the application, and the newly enabled wireless device is connected to the wireless sensor device. One of ordinary skill in the art readily recognizes that a variety of methodologies may be utilized to determine the proximity of the unconnected devices to the mobile device or relay device including but not limited to detectable received signal strength indication (hereafter "RSSI") and location based GPS systems and that would be within the spirit and scope of the present invention. The proximity information may be a filtered or may use an algorithm from the basic GPS or RSSI signal. This may include but is not limited to low pass filtering, median filtering, etc. on the basic signal. In another embodiment, the relay device, if not connected to the server or cloud may have a preloaded sensor ID list either entered in step 202b or previously stored that the relay device will automatically connect to or load when the device is detected or if the device is detected and within a certain proximity. The relay device, if connected to a cloud or server, may upload the list to the cloud or server either periodically, or it may be pushed from the cloud or server, whenever the list is changed or updated, or it may be pulled from the relay device when a new sensor is detected that is not on the already stored list, or a combination of these.

After the application retrieves the preloaded network addresses of the devices, the application then automatically compares the preloaded network addresses to the scanned network address of the newly enabled device in step 212b. In step 214b, when one of the preloaded network addresses matches the scanned network address of the newly enabled device, the wireless sensor device is automatically paired to the wireless relay device or mobile device which completes the registration process.

As above described, the method and system allow for an automated pairing of a wireless sensor device to a user to improve the efficiency of wireless sensor device tracking and registration. By implementing an application within a mobile device or relay device, an efficient and cost-effective wireless sensor device pairing system is achieved that can support a significant number of users and devices. Further such a system, method, and device makes for an easier process, better user experience, and less error prone system.

Figure 3:
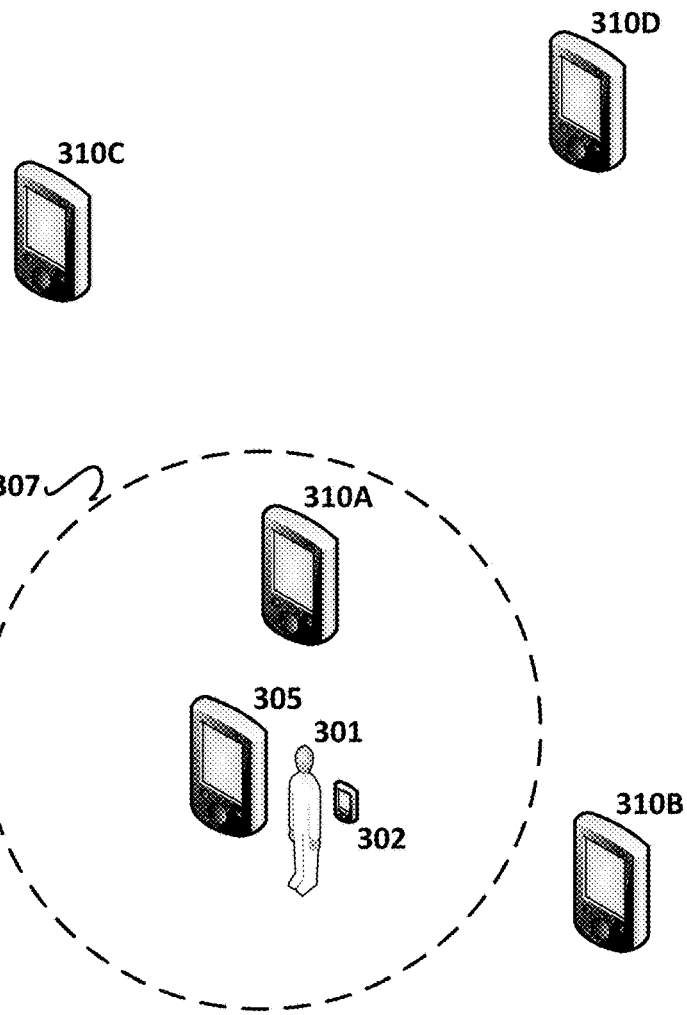
FIG. 3 illustrates an example system configuration for implementing one or more embodiments of identifying a roaming device for a communicative connection in accordance with an embodiment.

FIG. 3 shows an example system 300 configuration for implementing one or more embodiments of identifying a roaming device for a communicative connection.

In at least one example embodiment, system 300 may include one or more of wireless relay devices 305, 310A, 310B, 3100, and 310D.

One or more of wireless relay devices 305, 310A, 310B, 3100, and 310D may refer to a wireless processor-enabled device including, but not limited to a notebook computer, laptop computer, smart phone, etc., that is capable of hosting, initiating, and/or operating an application for which operation includes, in part, being communicatively connected, at least, to other similar wired or wireless devices, including but not limited to wireless sensor device 302. Further, wireless relay devices 305, 310A, 310B, 3100, and 310D may be either mobile or non-mobile (cell phones, relay hubs, etc). These relay devices may be connected to one another (mesh network) or they may all be connected wirelessly to a server or cloud.

In at least on alternative embodiment, one or more of wireless relay devices 305, 310A, 310B, 3100, and 310D may be a processor-enabled router. Wi-Fi hot-spot, or relay computer, e.g., notebook, laptop, smart phone, etc., that is communicatively connected individually or in tandem with wireless sensor device 302.

Wireless sensor device 302 may be a device that is on the body or connected to user or patient 301 and the patient 301 may or may not be ambulatory. Wireless sensor device 302 may also refer to a wireless processor-enabled device including, but not limited to a notebook computer, laptop computer, smart phone, wireless health monitor device, wireless vital sign monitoring device, etc., that is capable of hosting, initiating, and/or operating for which operation includes, in part, being communicatively connected, at least, to other wired or wireless devices, including but not limited to relay device 305. Further, wireless sensor device 302 which is on user 301 is detectable by wireless relay devices 305, 310A, 310B, 3100, and 310D.

In accordance with at least some implementations of identifying a roaming device for a communicative connection, one or more of wireless relay devices 305, 310A, 310B, 3100, and 310D and wireless sensor device 302 may be communicatively detectable relative to each other, at least antenna-to-antenna, via a communication link. Thus, one or more of wireless relay devices 305, 310A, 310B. 310C, and 310D may likely be capable of a communicative connection with an embodiment of wireless sensor device 302 that is within range.

However, implementations of identifying a roaming device for a communicative connection are not limited to short-range protocols. One or more of wireless relay devices 305, 310A, 310B, 3100, and 310D and wireless sensor device 302 may be communicatively detectable to each other, at least antenna-to-antenna, via a communication link that include various wireless networking and/or cellular technologies, such as LAN (Local Area Network), WAN (Wide Area Network), VAN (Value Added Network) or the like, or any one or more of known wireless networks, e.g., a mobile radio communication network, a satellite network, WiBro (Wireless Broadband Internet), Mobile WiMAX, HSDPA (High Speed Downlink Packet Access), WiFi, Bluetooth, Bluetooth Low Energy or the like.

Common to the various communication protocols by which the wireless sensor device 302 and wireless relay devices 305, 310A, 310B, 3100, and 310D may be connected, is a detectable received signal strength indication (hereafter "RSSI") calculated by each of the wireless relay devices based on their distance to the wireless sensor device. RSSI is a measure of the power present in a radio signal between the communicating wireless sensor device 302 and the wireless relay devices 305, 310A, 310B, 3100, and 310D. RSSI may be regarded as a relative received signal strength in a wireless environment. RSSI is an indication of the power level being received by the relay device 305 after antenna loss. Therefore, the higher the RSSI number, the stronger the signal and, presumably, the closer the wireless sensor devices 302 corresponding to the higher RSSI number is to relay device 305.

Further, RSSI has a correspondence to distance. Thus, in accordance with the example embodiment of FIG. 3, the threshold RSSI value for the application hosted, initiated, and/or operating on wireless relay devices 305, 310A, 310B, 3100, and 310D may have a substantial correspondence to the distance represented by the transmission radius 307, of which wireless sensor device 302 is the focal point. Accordingly, in the example embodiment, wireless relay devices 305 and 310A will have an RSSI that meets or exceeds the determined threshold value when wireless sensor device 302 tries to connect to a relay, and thus, either wireless relay device 305 or 310A will attempt to make a communicative connection with wireless sensor device 302, via the respective instances of the same application running thereon.

Wireless relay device 305 may include an internal wireless networking card (not shown) to detect and measure the RSSI between wireless relay device 305 and the wireless sensor device 302.

In accordance with at least some implementations of identifying a roaming device for a communicative connection, a connection manager corresponding to wireless relay device 305 may include an application manager that determines and/or detects a threshold value for a signal index, e.g., RSSI, for signals from wireless sensor device 302, upon initiation of an application on the wireless relay device 305. The connection manager may also include a wireless sensor device detector that determines the signal index from wireless sensor device 302; and a wireless sensor device identifier that identifies those the proximately-located wireless sensor devices for which the determined signal index equals or exceeds the determined threshold value. That is, those embodiments of wireless sensor device 302 that do not even meet the determined threshold value are not identified for selection. The connection manager further includes a wireless sensor device connector that communicatively connects relay device 305 to at least one embodiment of wireless sensor devices 302, preferably that having the strongest RSSI, for implementing communication between the devices via the respective instances of the particular application running on both devices.

In some embodiments, selection of wireless sensor device 302 is automated; while in others, the selection is user-implemented. Thus, in the former embodiments, only those wireless sensor devices for which the RSSI meets or exceeds the threshold value, may be eligible for communicative connection to relay device 305; whereas in the latter embodiments, only those wireless sensor devices for which the RSSI meets or exceeds the threshold value are even identified, e.g., for the user of relay device 305 to select.

Figure 4:
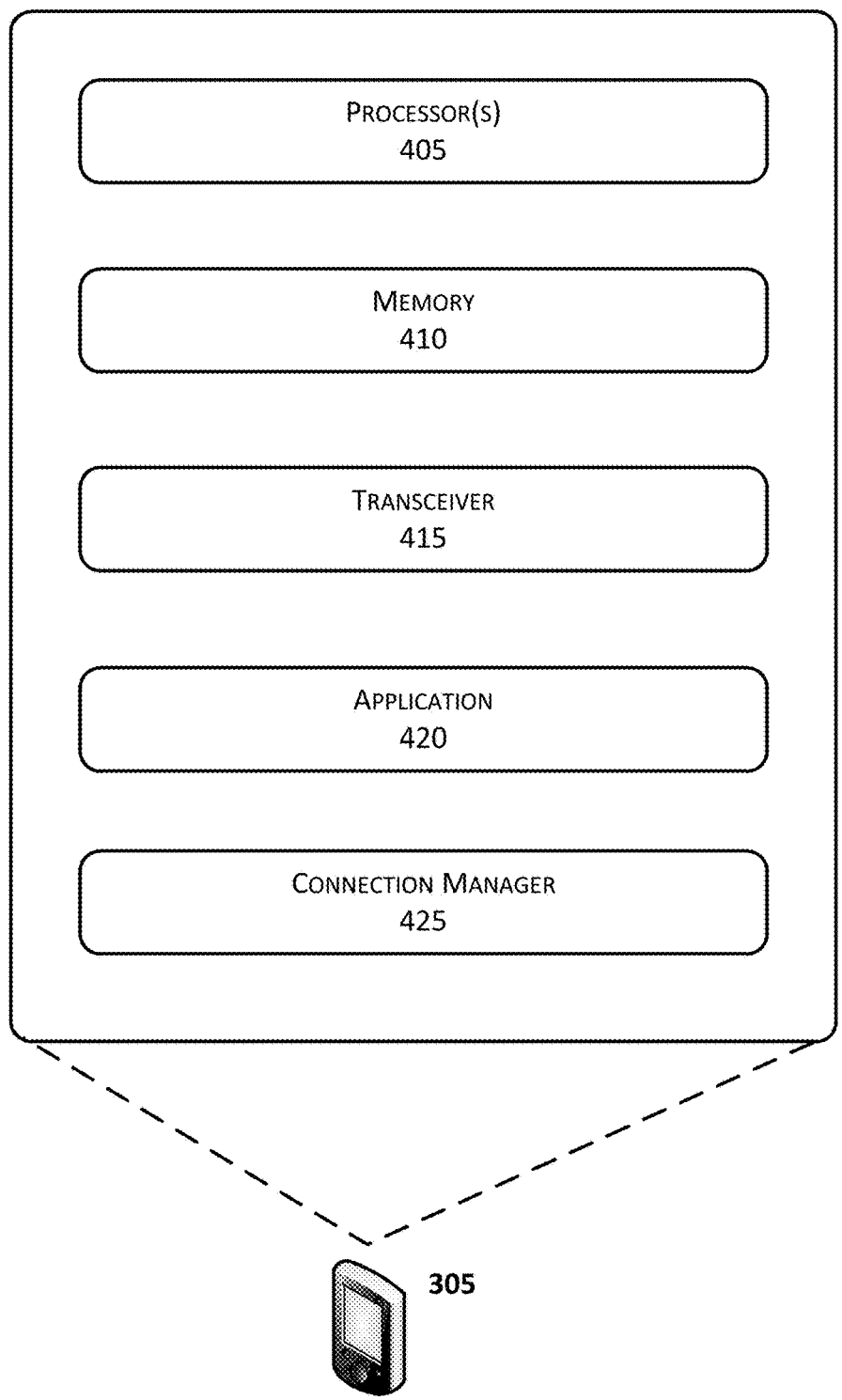
FIG. 4 illustrates an example configuration of a master device by which aspects of identifying a roaming device for a communicative connection may be implemented in accordance with an embodiment.

FIG. 4 shows an example configuration of a master device by which aspects of identifying a roaming device for a communicative connection may be implemented.

As depicted, relay device 305 may include one or more processors 405, memory 410, transceiver 415, application 420, and connection manager 425. Although illustrated as discrete components, these various components may be divided into additional components, combined into fewer components, or eliminated altogether while being contemplated within the scope of the disclosed subject matter. Further, it will be understood by those of ordinary skill in the art that each example component may be implemented, individually and/or collectively, by a wide range of hardware, software, firmware, or virtually any combination thereof.

Processor(s) 405 may refer to one or more processors that enable the functionality of the various components of relay device 305. Processors(s) 410 may be deployed singularly or as a plurality thereof, depending on processing capabilities and/or requirements of the remaining components of relay device 305.

Memory 410 may refer to one or more storage components that may be designed, programmed, and/or configured to store, at least temporarily, signal strength index data. In at least some embodiments of relay device 305, the storage capacity of memory 410 may be commensurate with a size of relay device 305 and/or processing power of processor(s) 405.

Transceiver 415 may refer to one or more executable components that may be designed, programmed, and/or configured as a transmitter to transmit and even receive data including, e.g., but not limited to, at least antenna-to-antenna, via a communication link that include various wireless networking and/or cellular technologies, such as LAN (Local Area Network), WAN (Wide Area Network), VAN (Value Added Network) or the like, or any one or more of known wireless networks, e.g., a mobile radio communication network, a satellite network, WiBro (Wireless Broadband Internet), Mobile W MAX, HSDPA (High Speed Downlink Packet Access) or the like Further, transceiver 425 may be designed, programmed, and/or configured as a receiver to receive a data frame, upon initiation of application 420, from proximately-located embodiments of wireless sensor devices 302.

Application 420 may refer to an executable program that is hosted, initiated, and/or operated on relay device 305, as well as on wireless sensor devices 302. Embedded within application 420 is a threshold signal strength index value, e.g., RSSI, or a link to such value that is stored on memory 410.

Connection manager 425 may refer to an executable component that is designed, programmed, and/or configured to determine the threshold signal strength index value, e.g., RSSI, for application 420 on relay device 305 and one or more of wireless sensor devices 302; and identify, for a communicative connection, only those embodiments of wireless sensor devices 302 for which the signal strength index value, relative to relay device 305, meets or exceeds the threshold value, all upon imitation of application 420 on relay device 305 and/or upon receiving an initial data frame from any of wireless sensor devices 302.

FIG. 5 shows an example configuration of connection manager 425 by which aspects of identifying a roaming device for a communicative connection may be implemented.

As depicted, connection manager may include application manager 505, slave device detector 510, slave device identifier 515, and slave device 520. Although illustrated as discrete components, these various components may be divided into additional components, combined into fewer components, or eliminated altogether while being contemplated within the scope of the disclosed subject matter. Further, it will be understood by those of ordinary skill in the art that each example component may be implemented, individually and/or collectively, by a wide range of hardware, software, firmware, or virtually any combination thereof.

Application manager 505 may refer to an executable component of connection manager 425 that may be designed, programmed, and/or configured to determine a threshold value for a signal strength index, e.g., RSSI, that is embedded in application 420 or for which a link to the value, stored on memory 410, is embedded in application 420. The threshold value may be deemed to be the minimum signal strength index value, e.g., RSSI, required for wireless sensor device 302 to be identified as a candidate for a communicative connection to relay device, via application 420.

Slave device detector 510 may refer to an executable component of connection manager 225 that may be designed, programmed, and/or configured to detect an initial data frame from wireless sensor device 302 upon initiation of application 420 on relay device 305; and, further, determine the actual signal strength index value corresponding to the detected initial data frame. Slave device detector 510 may perform iterations of such detection and determination repeatedly, as initial data frames are received from various embodiments of wireless sensor device 302, or on a predetermined time basis, e.g., 1 sec.

Slave device identifier 515 may refer to an executable component of connection manager 425 that may be designed, programmed, and/or configured to determine whether the detected signal strength index, e.g., RSSI, for the detected initial data frame meets or exceeds the determined threshold value.

If relay device 305 is, e.g., a Wi-Fi hotspot, and therefore connection to a wireless sensor device is automated, slave device identifier 515 may be designed, programmed, and/or configured to prohibit communicative connection to an embodiment of wireless sensor device 302 for which the detected signal strength index, e.g., RSSI, does not at least meet the threshold value that is embedded in application 420 or stored in memory 410.

Accordingly, since not all embodiments of wireless sensor device 302 are labeled or otherwise identified to relay device 305, and because often multiple embodiments of wireless sensor device 302 are physically eligible for communicative connection to relay device 305, when relay device 305 scans for a slave device to connect, myriad slave devices may be deemed eligible for connection. Thus, slave device identifier may be utilized to limit the number of slave devices to which wireless relay device 305 may communicatively connect, or otherwise make selection of a partner device more easily managed.

If relay device 305 is a mobile device for which connection to a wireless sensor device is manually activated by, e.g., user 101, slave device identifier 515 may be designed, programmed, and/or configured to display an identifier only for those embodiments of wireless sensor devices 302 for which the detected signal strength index, e.g., RSSI, meets or exceeds the threshold value that is embedded in application 420 or stored in memory 410. In addition, or alternatively, slave device identifier 515 may also be designed, programmed, and/or configured to prohibit communicative connection to an embodiment of wireless sensor devices 302 for which the detected signal strength index does not at least meet the threshold value.

Slave device connector 520 may refer to an executable component of connection manager 425 that may be designed, programmed, and/or configured to communicatively connect relay device 305 to one or more embodiments of wireless sensor devices 302 for which the detected signal strength index, e.g., RSSI, at least meets the threshold value that is embedded in application 420 or stored in memory 410, as determined by slave device identifier 515.

As set forth above, aspects and embodiments of the disclosure may be arranged, substituted, combined, separated, and designed in a wide variety of different configurations, all of which are explicitly contemplated herein; thus, aspects and embodiments of FIGS. 1-5 may be arranged, substituted, combined, separated, and designed in a wide variety of different configurations. For example, wireless sensor device 102, and mobile device or relay device 104 of FIGS. 1 and 2, may be arranged, substituted, combined, separated, etc., with wireless sensor device 302 and relay device 305, of FIGS. 3-5. Further, elements, features, aspects, and embodiments, etc, of wireless sensor device 102, and mobile device or relay device 104 of FIGS. 1 and 2, may be arranged, substituted, combined, separated, etc., with elements, features, aspects, and embodiments, etc, of wireless sensor device 302 and relay device 305, of FIGS. 3-5. Further still, the quantity and even positioning of the wireless sensor devices in FIG. 3 is in no way representative or limiting of all contemplated embodiments of identifying a remaining device for a communicative connection. Thus, unless context otherwise requires, reference may be made herein to singular wireless sensor device 302 or plural wireless sensor devices 302.

A method and system for pairing a wireless sensor device to a user has been disclosed. Embodiments described herein can take the form of an entirely hardware implementation, an entirely software implementation, or an implementation containing both hardware and software elements. Embodiments may be implemented in software, which includes, but is not limited to, application software, firmware, resident software, microcode, etc.

The steps described herein may be implemented using any suitable controller or processor, and software application, which may be stored on any suitable storage location or computer-readable medium. The software application provides instructions that enable the processor to cause the receiver to perform the functions described herein.

Furthermore, embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include DVD, compact disk-read-only memory (CD-ROM), and compact disk-read/write (CD-R/W).

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for pairing a wireless relay device to a wireless sensor device monitoring a user, comprising:
   implementing a configuration period to store a list of wireless sensor device addresses by a wireless relay device;
   utilizing, by the wireless relay device, an application to wirelessly scan for a network address of an enabled wireless sensor device monitoring the user that is within a proximity to the wireless relay device;
   obtaining, by the wireless relay device, the network address of the enabled wireless sensor device;
   comparing the network address of the enabled wireless sensor device to the list of wireless sensor device addresses stored by the wireless relay device; and
   automatically pairing, by the wireless relay device, the enabled wireless sensor device to the wireless relay device in response to the network address matching an address of the list of wireless sensor device addresses.

2. The method of claim 1, further comprising refreshing, by the wireless relay device, the list of wireless sensor device addresses in response to detecting the wireless sensor device.

3. The method of claim 1, further comprising refreshing, by the wireless relay device, the list of wireless sensor device addresses in response to the wireless relay device being within a predetermined proximity to the wireless sensor device.

4. The method of claim 1, further comprising uploading, by the wireless relay device, a preloaded sensor ID list to a cloud server.

5. The method of claim 1, further comprising receiving, by the wireless relay device, an updated sensor ID list from a cloud server in response to a detected wireless sensor that is not on a stored sensor ID list of the wireless relay device.

6. The method of claim 1, further comprising receiving, by the wireless relay device, an updated sensor ID list from a cloud server in response to the sensor ID list being updated in the cloud server.

7. The method of claim 1, wherein a proximity of the wireless relay device to the wireless sensor device is determined based on a Received Signal Strength Indication (RSSI).

8. The method of claim 1, wherein the automatically pairing of the wireless relay device to the wireless sensor device is in further response to a Received Signal Strength Indication (RSSI) seen by the relay device meeting or exceeding a predetermined threshold value.

9. The method of claim 1, wherein proximity information used to determine whether the unconnected devices are within the proximity to the wireless relay device, is filtered by at least one of: low pass filtering, median filtering, or averaging.

10. The method of claim 1, wherein the application allows the user to associate the user with the sensor device by at least one of: selection, input, or from a preloaded list.

11. A non-transitory computer-readable medium containing program instructions for pairing a wireless relay device to a wireless sensor device monitoring a user, wherein execution of the program instructions by one or more processors of a wireless relay device causes the one or more processors to perform the process of:

implementing a configuration period to store a list of wireless sensor device addresses by a wireless relay device;

utilizing, by the wireless relay device, an application to wirelessly scan for a network address of a enabled wireless sensor device monitoring the user that is within a proximity to the wireless relay device;

obtaining, by the wireless relay device, the network address of the enabled wireless sensor device;

comparing the network address of the enabled wireless sensor device to the list of wireless sensor device addresses stored by the wireless relay device; and automatically pairing, by the wireless relay device, the enabled wireless sensor device to the wireless relay device in response to the network address matching an address of the list of wireless sensor device addresses.

12. The non-transitory computer-readable medium containing the program instructions for pairing a wireless relay device to a wireless sensor device monitoring a user of claim 11, wherein further execution of the program instructions by the one or more processors of the wireless relay device causes the one or more processors to perform the process of:

refreshing, by the wireless relay device, the list of wireless sensor device addresses in response to detecting the wireless sensor device.

13. The non-transitory computer-readable medium containing the program instructions for pairing a wireless relay device to a wireless sensor device monitoring a user of claim 11, wherein further execution of the program instructions by the one or more processors of the wireless relay device causes the one or more processors to perform the process of:

refreshing, by the wireless relay device, the list of wireless sensor device addresses in response to the wireless relay device being within a predetermined proximity to the wireless sensor device.

14. The non-transitory computer-readable medium containing the program instructions for pairing a wireless relay device to a wireless sensor device monitoring a user of claim 11, wherein further execution of the program instructions by the one or more processors of the wireless relay device causes the one or more processors to perform the process of:

uploading, by the wireless relay device, a preloaded sensor ID list to a cloud server.

15. The non-transitory computer-readable medium containing the program instructions for pairing a wireless relay device to a wireless sensor device monitoring a user of claim 11, wherein further execution of the program instructions by the one or more processors of the wireless relay device causes the one or more processors to perform the process of:

receiving, by the wireless relay device, an updated sensor ID list from a cloud server in response to a detected wireless sensor that is not on a stored sensor ID list of the wireless relay device.

16. The non-transitory computer-readable medium containing the program instructions for pairing a wireless relay device to a wireless sensor device monitoring a user of claim 11, wherein further execution of the program instructions by the one or more processors of the wireless relay device causes the one or more processors to perform the process of:

receiving, by the wireless relay device, an updated sensor ID list from a cloud server in response to the sensor ID list being updated in the cloud server.

17. The non-transitory computer-readable medium containing the program instructions for pairing a wireless relay device to a wireless sensor device monitoring a user of claim 11, wherein a proximity of the wireless relay device to the wireless sensor device is determined based on a Received Signal Strength Indication (RSSI).

18. The non-transitory computer-readable medium containing the program instructions for pairing a wireless relay device to a wireless sensor device monitoring a user of claim 11, wherein the automatically pairing of the wireless relay device to the wireless sensor device is in further response to a Received Signal Strength Indication (RSSI) seen by the relay device meeting or exceeding a predetermined threshold value.

19. The non-transitory computer-readable medium containing the program instructions for pairing a wireless relay device to a wireless sensor device monitoring a user of claim 11, wherein the unconnected devices within the proximity corresponds to the unconnected devices having a Received Signal Strength Indication (RSSI) that meets or exceeds a predetermined threshold value.

20. The non-transitory computer-readable medium containing the program instructions for pairing a wireless relay device to a wireless sensor device monitoring a user of claim 11, wherein proximity information used to determine whether the unconnected devices are within the proximity to the wireless relay device, is filtered by at least one of: low pass filtering, median filtering, or averaging.

* * * * *